(12) United States Patent
Aaron et al.

(10) Patent No.: US 9,456,250 B2
(45) Date of Patent: *Sep. 27, 2016

(54) AUTOMATIC RATING OPTIMIZATION

(71) Applicant: AT&T INTELLECTUAL PROPERTY I, L.P., Atlanta, GA (US)

(72) Inventors: Jeffrey Aaron, Atlanta, GA (US); Thomas Anschutz, Conyers, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/621,300

(22) Filed: Sep. 17, 2012

(65) Prior Publication Data

US 2014/0081991 A1 Mar. 20, 2014
US 2016/0156978 A9 Jun. 2, 2016

Related U.S. Application Data

(63) Continuation of application No. 11/611,700, filed on Dec. 15, 2006, now Pat. No. 8,286,206.

(51) Int. Cl.
*G06F 7/00* (2006.01)
*G06F 13/30* (2006.01)
*H04N 21/475* (2011.01)
(Continued)

(52) U.S. Cl.
CPC ...... *H04N 21/4756* (2013.01); *H04N 21/2407* (2013.01); *H04N 21/252* (2013.01); *H04N 21/44222* (2013.01); *H04N 21/4532* (2013.01); *H04N 21/4662* (2013.01); *H04N 21/4667* (2013.01); *H04N 21/4668* (2013.01)

(58) Field of Classification Search
CPC ... G06F 17/00; G06Q 30/02; G06Q 30/0282
See application file for complete search history.

(56) References Cited

U.S. PATENT DOCUMENTS 5,973,683 A * 10/1999 Cragun et al. ............. 715/719
6,260,064 B1 * 7/2001 Kurzrok ..................... 709/224
(Continued)

FOREIGN PATENT DOCUMENTS

| AU | WO 0075818 A1 * | 12/2000 | ............. G06Q 30/06 |
| GB | WO 2006093593 A1 * | 9/2006 | ....... G06F 17/30035 |
| WO | WO 0180087 A1 * | 10/2001 | ......... G06F 17/3061 |

OTHER PUBLICATIONS

Graham, John "An elementary treatise on the calculus for engineering students", 1896, Son & Chamberlain, New York, preface, pp. 1-5.

(Continued)

*Primary Examiner* — Augustine K Obisesan
(74) *Attorney, Agent, or Firm* — Guntin & Gust, PLC; Robert Gingher

(57) ABSTRACT

Automatic rating optimization is described. In an embodiment, ratings of a program can be received from one or more rating sources. Based on these ratings, a representation of a content selection mechanism can be sent to potential consumers of the content. Access events for the content can be counted over a duration of time so a determination can be made regarding how the ratings provided by each of the rating sources affect popularity of the content. A weight accorded to ratings received from each of the rating sources can be adjusted based on the determination. Profiles can be established for consumers and/or rating sources.

20 Claims, 8 Drawing Sheets

(51) Int. Cl.
*H04N 21/442* (2011.01)
*H04N 21/25* (2011.01)
*H04N 21/45* (2011.01)
*H04N 21/466* (2011.01)
*H04N 21/24* (2011.01)

(56) References Cited

U.S. PATENT DOCUMENTS

| | | | |
|---|---|---|---|
| 6,529,526 B1* | 3/2003 | Schneidewend | H04N 5/4401 348/E5.007 |
| 6,606,102 B1 | 8/2003 | Odom | |
| 6,665,655 B1* | 12/2003 | Warner et al. | |
| 7,089,246 B1* | 8/2006 | O'Laughlen | 726/4 |
| 7,296,284 B1 | 11/2007 | Price et al. | |
| 7,519,562 B1* | 4/2009 | Vander Mey | G06Q 30/02 705/12 |
| 7,716,225 B1* | 5/2010 | Dean et al. | 707/748 |
| 8,601,004 B1* | 12/2013 | Mahadevan et al. | 707/751 |
| 2002/0010759 A1* | 1/2002 | Hitson et al. | 709/219 |
| 2002/0032776 A1* | 3/2002 | Hasegawa | G06Q 10/10 709/225 |
| 2002/0178057 A1 | 11/2002 | Bertram et al. | |
| 2002/0198866 A1* | 12/2002 | Kraft | H06G 17/30864 |
| 2003/0028527 A1* | 2/2003 | Crosby et al. | 707/3 |
| 2003/0088872 A1 | 5/2003 | Maissel et al. | |
| 2003/0093793 A1 | 5/2003 | Gutta | |
| 2003/0110486 A1 | 6/2003 | Dew et al. | |
| 2003/0135553 A1* | 7/2003 | Pendakur | 709/205 |
| 2004/0003394 A1* | 1/2004 | Ramaswamy | 725/28 |
| 2004/0230598 A1* | 11/2004 | Robertson et al. | 707/102 |
| 2005/0022234 A1* | 1/2005 | Strothman | H04N 5/44543 725/34 |
| 2005/0022239 A1* | 1/2005 | Meuleman | 725/46 |
| 2005/0050094 A1* | 3/2005 | Cordery et al. | 707/104.1 |
| 2005/0066357 A1* | 3/2005 | Ryal | 725/35 |
| 2005/0125307 A1* | 6/2005 | Hunt et al. | 705/26 |
| 2005/0159998 A1* | 7/2005 | Buyukkokten | G06Q 50/01 705/319 |
| 2005/0182722 A1* | 8/2005 | Meyer et al. | 705/40 |
| 2005/0223002 A1* | 10/2005 | Agarwal et al. | 707/7 |
| 2006/0015352 A1* | 1/2006 | Wynn et al. | 705/1 |
| 2006/0059260 A1* | 3/2006 | Kelly et al. | 709/225 |
| 2006/0123014 A1* | 6/2006 | Ng | 707/100 |
| 2006/0148446 A1* | 7/2006 | Karlsson | H04L 12/14 455/406 |
| 2006/0170759 A1* | 8/2006 | Roever et al. | 348/14.03 |
| 2006/0200445 A1* | 9/2006 | Chen et al. | 707/2 |
| 2006/0288074 A1 | 12/2006 | Rosenberg | |
| 2007/0136753 A1* | 6/2007 | Bovenschulte et al. | 725/46 |
| 2007/0143778 A1* | 6/2007 | Covell et al. | 725/19 |
| 2007/0174872 A1* | 7/2007 | Jing et al. | 725/46 |
| 2007/0179835 A1* | 8/2007 | Ott | G06Q 30/02 705/306 |
| 2007/0204287 A1* | 8/2007 | Conradt et al. | 725/28 |
| 2007/0233701 A1* | 10/2007 | Sherwood | G06F 17/30029 |
| 2007/0266401 A1* | 11/2007 | Hallberg | 725/46 |
| 2008/0040748 A1* | 2/2008 | Miyaki | G11B 27/036 725/46 |
| 2008/0077568 A1 | 3/2008 | Ott | |
| 2008/0189733 A1* | 8/2008 | Apostolopoulos | H04N 7/17318 725/28 |

OTHER PUBLICATIONS

Nove, Carl R. "Description of Motion", Mar. 7, 2000, HyperPhysics, http://hyperphysics.phy-astr.gsu.edu/hbase/mot.html.
Internet Archive Wayback Machine, "Archived Results from Jan. 1, 1996—latest" for http://hyperphysics.phy-astr.gsu.edu/hbase/mot.html.
Boatwright et al. "Reviewing the Reviewers: The Impact of Individual Film Critics on Box Office Performance"; Feb. 2006; Carnegie Mellon Tepper School of Business website; whole document.

* cited by examiner

AUTOMATIC RATING OPTIMIZATION

CROSS REFERENCE TO RELATED APPLICATION

This application is a continuation of U.S. application Ser. No. 11/611,700, filed Dec. 15, 2006, the entirety of which is incorporated herein by reference.

BACKGROUND

During the past several years, television viewing habits have been rapidly changing in response to an increased availability of viewing content and to technological advances in the distribution and delivery of viewing content. As part of the increased availability of viewing content, more rare (or niche) programs are becoming available for viewers who may be interested in viewing such programs. Unfortunately, as increasingly larger amounts of content are made available, it is becoming increasingly difficult for a viewer to locate the rare content which he/she may be interested in viewing. Viewers who are interested in niche content often find themselves searching for the proverbial "needle in a haystack".

Current program rating and/or recommendation systems typically rate programs by assigning a number of "stars", and/or other symbols to the program as an indication of the quality of the program. In other cases, programs and movies may be rated by the Motion Picture Association of America (MPAA) according to MPAA guidelines, and/or may be rated by broadcast and cable television networks according to the networks' guidelines.

Although current rating and/or recommendation systems can be of some assistance to viewers in locating viewing content, many viewers are becoming increasingly disenchanted with the current system, and do not trust the ratings and/or recommendations provided by such systems. The limitations of current ratings and/or recommendation systems are particularly apparent in the case of rare or niche programs. In many cases no ratings have been assigned to such programs, and in cases where a rating has been assigned, those with an interest in rare or niche programs often find that the ratings provided by the current program rating and/or recommendation systems cannot be trusted, and/or are suited for typical viewer preferences rather than for the unique preferences of the niche viewer.

SUMMARY

This summary is provided to introduce basic concepts of automatic rating optimization which is further described below in the Detailed Description. This summary is not intended to identify necessary features of the claimed subject matter, nor is it intended for use in determining the scope of the claimed subject matter.

In an embodiment of automatic rating optimization, ratings of a program can be received from one or more rating sources, and these ratings can be sent to potential viewers of the program. Access events for the program can be counted over a duration of time so a determination can be made regarding how the ratings provided by each of the rating sources affect the popularity of the program. A weight accorded to ratings received from each of the rating sources can be adjusted based on the determination.

In another embodiment of automatic rating optimization, a viewer can be associated with a preference profile based on viewing habits of the view, and rating sources can be associated with the preference profiles based on viewing habits of the rating sources, so that each rating source is associated with one of the viewer and the preference profiles of each of the rating sources can be determined, and a weight accorded to rating received from each of the rating sources can be adjusted on the determination of the degree of relatedness.

BRIEF DESCRIPTION OF THE DRAWINGS

The same numbers are used throughout the drawings to reference like features and components.

DETAILED DESCRIPTION

Figure 1:
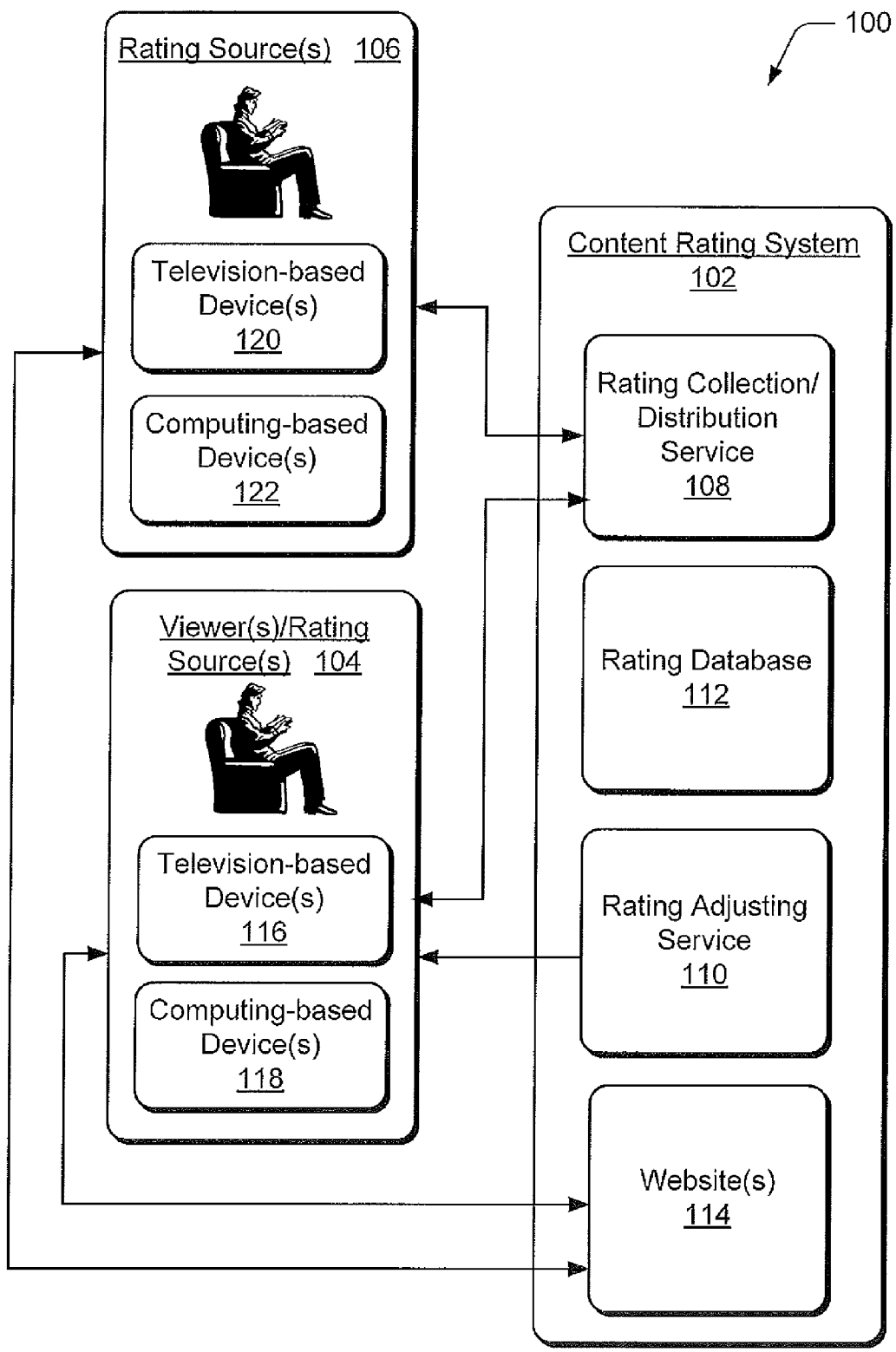
FIG. 1 is a block diagram of an exemplary environment in which embodiments of automatic rating optimization can be implemented.

Automatic rating optimization is described in which embodiments provide that input ratings of content are received from one or more individual rating sources, that output ratings are calculated from these input ratings, and that the calculated output ratings are then sent to potential consumers of the content. Access events for the content are counted over a duration of time and a determination is made regarding how the ratings provided by each of the rating sources affected popularity of the content. A weight accorded to ratings received from each of the rating sources is then adjusted based on the determination so that different rating sources will have a different amount of influence on an overall rating that is assigned to the content.

In the context of this description, the term "ratings" may refer to any metadata about the content that would be useful in helping potential consumers choose content. For example, the content could include one or more programs. This metadata may include information relating to a duration of the content, details of a plot, technology used to view the content, tie-ins, general descriptive data, and the like.

Ratings may refer to input ratings that are provided by individual contributors, or to output ratings that are derived, aggregated, or calculated based on these contributions. A prospective viewer of a given instance of content may be provided with the output ratings as derived from a variety of contributors or sources.

In some instances, the prospective viewer may be provided with an output rating from a single source. For example, if reviews from a given reviewer are accorded sufficient authority or weight, then reviews from only that particular reviewer may be provided. As another example, reviews from a single reviewer from the prospective viewer's peer group may be provided.

In the context of this description, the term "content" may refer to any data or subject matter that may be accessed, viewed, listened to, played, utilized, or otherwise consumed. Examples of content may include, but are not limited to, programs, clips, podcasts, games, MP3 files, other forms of digital media, or the like. Similarly, the term "consumer" may refer to any subscriber, customer, person or user who may access the content, whether by viewing, listening, playing, or the like.

Automatic rating optimization therefore provides new ways of generating rating and/or recommendations which take into consideration the affect that a rating source's prior ratings and/or recommendations have had on the popularity of the programs. Implementations of automatic rating optimization look at results for ratings and/or recommendations provided by various rating sources, correlate the results with the rating sources, and then adjust various rating sources, correlate the results with the rating sources, and then adjust a weight given to different rating sources so that different rating sources will have a different impact on the overall rating for a program. For example, if a rating source's prior ratings have had a positive effect on popularity of programs which it rated, a higher weight can be accorded ratings received from that rating source. On the other hand, if a rating source's prior ratings have had a negative effect on popularity of programs which it rated, a lower weight can be accorded ratings received from that rating source. By adjusting the weight accorded to the ratings received from the different source, a more useful rating can be assigned to a program.

Implementations of automatic rating optimization also provide that the weight accorded to ratings received from the rating sources can be adjusted differently for ratings related to different genres of programs. For example, if a particular rating source is very good at rating mysteries, and very poor at rating cooking programs, the weight accorded to ratings received from the rating source can be adjusted differently for programs within these different genres. Implementations of automatic rating optimization also provide that a rating source can be excluded from the overall rating. Other implementations of automatic rating optimization provide that a higher or lower weight can be accorded to all ratings received from a particular rating source.

Embodiments of automatic rating optimization also provide that a viewer can be associated with a preference profile based on viewing habits of the viewer, and that rating sources can be associated with preference profiles based on viewing habits of the rating sources so that each rating source is associated with one of the preference profiles. A degree of relatedness between the preference profile of the view and the preference profiles of each of the rating sources is determined, and a weight accorded to ratings received from each of the rating sources is adjusted based on the determining of the degree of relatedness.

Automatic rating optimization therefore provides that preference profiles can be established for viewers and/or rating sources, and that such preference profiles can be used to generate more accurate rating of programs. For example, in some implementations, the viewer is presented with a rating that has been tailored and/or adjusted for a particular group profile. In other implementations, the view is presented with a customized rating profile based on their personal profile.

In other aspects, ratings given by a viewer may be correlated with ratings provided by one or more other reviewers for previously experienced content. In this matter, these correlated rating enable or allow viewers to formulate expectations for new content that has been rated by these same reviewers. For example, the preferences or opinions of a given viewer may closely track those of one or more reviewers, such that if the reviewer likes or dislikes a given item, the viewer may expect to similarly like or dislike that given item.

The program rating presented to one potential viewer can be different than the program rating presented to another potential viewer for the same program, because the potential viewers' profiles can be taken into consideration, and the rating can be adjusted accordingly. For example, less weight can be accorded to the ratings received from rating sources that are in profiles distant from the viewer's profile, while more weight can be accorded to the ratings received from the rating sources that are in profiles proximate the viewer's profile.

While aspects of the described systems and methods for automatic rating optimization can be implemented in any number of different computing systems, environments, television-based entertainment systems, and/or configurations, embodiments of automatic rating optimization are described in the context of the following exemplary system architecture(s).

FIG. 1 illustrates an exemplary environment 100 in which embodiments of automatic rating optimization can be implemented. The environment 100 includes a program rating system 102, viewer(s)/rating source(s) 104, and rating source(s) 106 (the viewer(s) and the viewer(s)/rating source(s) are each shown here a person sitting in a chair). As used herein, the term "program" refers to any television program, movie, on-demand media content, broadcast media content, and/or any other similar media content items. As used herein, the term "rating source" refers to any person, group of people, and/or entity that provides a rating and/or comments regarding a program and/or other media content asset. For example, a rating source may be a person who is a professional movie critic, a panel of experts, a husband and wife, a family, a viewer, a customer, a subscriber, and/or any other person or entity who rates a program and/or provides comments regarding the program.

Although in many cases, expert ratings of programs can be of value, in the context of rare and/or niche content, the ratings received from viewers/customers are often more helpful than ratings received from experts. In many cases rare and/or niche content will not have been rated by experts, and even when such programs have been rated by experts, in many cases the expert will not share the interests of the niche viewer, and accordingly the review received from the expert may not be very useful to the niche viewer.

FIG. 1 illustrates the viewer/rating source 104 and the rating source 106 as two individual blocks. This is to emphasize that in some implementation a rating source can provide ratings without being a viewer, as indicated by reference number 106, and that alternatively the rating source can be both a viewer and rating source as indicated by reference number 104. In other words, the viewer/rating source 104 may provide a rating for a program and/or other media content item which the viewer/rating source 104 accesses, while the rating source 106 may provide ratings for a program and/or other media content item which the rating source 106 has not accessed. Accordingly, the "viewer/rating source" 104 is also referred to simply as a "viewer" herein. Further, when describing the viewer 104 who may be shown a rating and/or comments regarding a program, the viewer 104 is referred to as a "potential viewer" herein. Similarly, when discussing the viewer 104 who may be interested in rare or niche content, the viewer 104 is referred to as a "niche viewer" herein.

The program rating system 102 includes a rating collection/distribution service 108, a rating adjusting service 110, a rating database 112, and can also include one or more associated Websites 114. The viewer 104 can use a television-based client device 116 and/or a computing-based device 118 to submit a rating for a program and/or comments regarding the program to the program rating system 102 as described herein. Similarly, the rating source 106 can use a television-based client device 120 and/or a computing-based device 122 to submit a rating for a program and/or comments regarding the program to the program rating system 102 as described herein.

Figure 2:
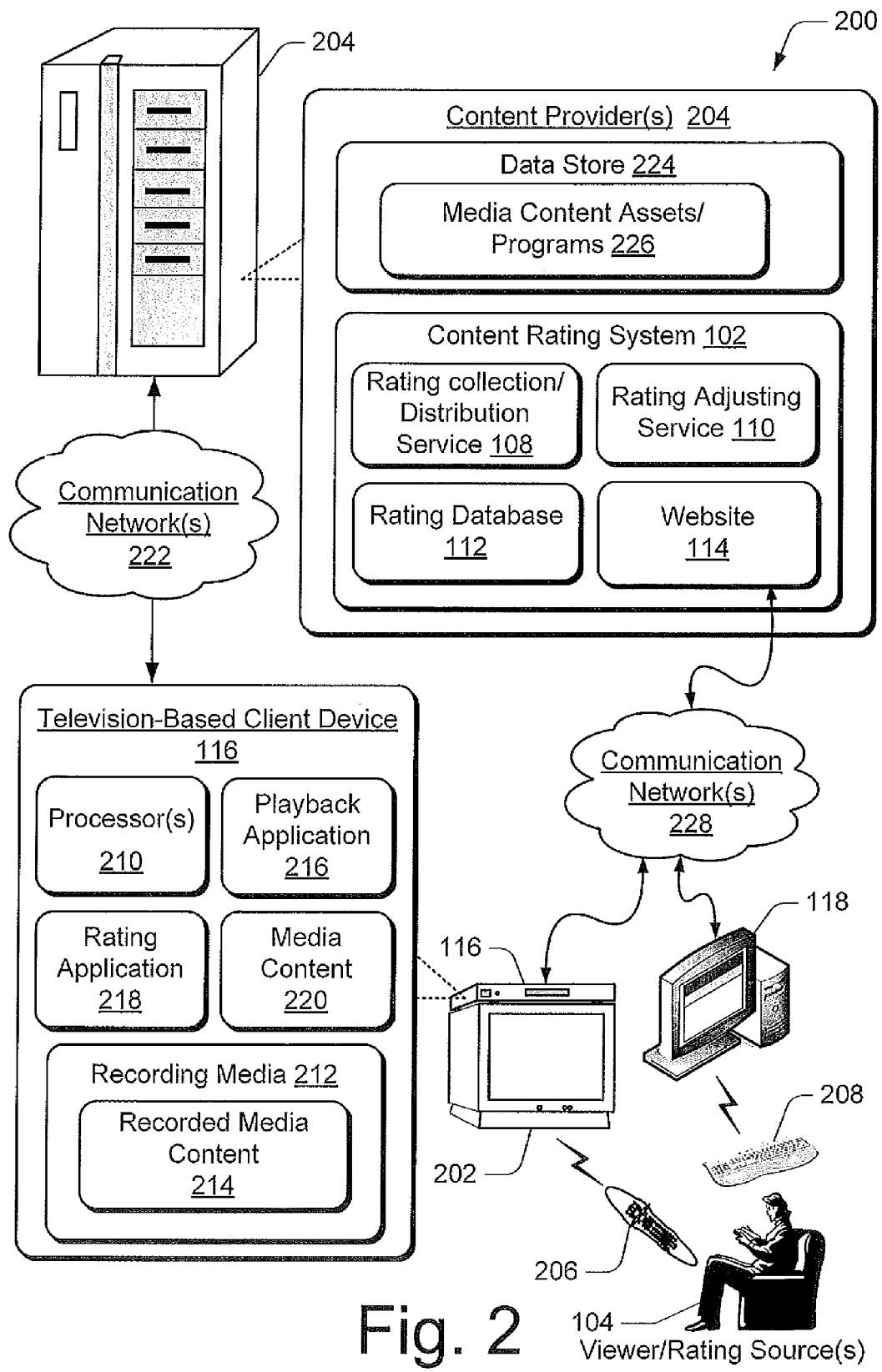
FIG. 2 is a block diagram of an exemplary environment in which further aspects of embodiments of automatic rating optimization are described.

FIG. 2 illustrates an exemplary environment 200 in which further aspects of embodiments of automatic rating optimization can be described. The exemplary environment 200 includes the television-based client device 116, a display device 202, content provider(s) 204, and an input device 206 such as a remote control device. The exemplary environment 200 may also include the computing device 118, and an input device 208 such as a computer keyboard and/or mouse. The input devices 206 and 208 can be used by the viewer/rating source 104 to interact with the television based client device 116 and/or to interact with the computing device 118. For example, the viewer 104 can use one or more of the input devices 206 and 208 to input ratings of programs, input comments regarding programs, and/or for other purposes such as navigating interactive on-screen menus and/or program guides, and/or for selecting programs and/or other media content assets for viewing. The viewer 104 may also use the input devices 206 and 208 for navigating to the Website 114 which is associated with the program rating system 102 as described herein.

The display 202 can by any type of television, liquid crystal display (LCD), or similarly display system that renders audio, video, and/or image data. The computing device 118 can be any type of computing device which is capable of communicating ratings and/or comments to the content provider 204. Although illustrated as a desktop computer, the computing device 118 can alternatively be a portable device such as a cell phone, a combination device such as a personal digital assistant (PDA), a laptop computer, and/or any other similar computing device.

The client device 116 can be implemented in any number of embodiments, such as a set-top box, a digital video recorder (DVR) and playback system, and/or as any other type of client device that may be implemented in a television-based entertainment and information system. In the illustrated example, the client device 116 includes one or more processor(s) 201, recording media 212 for maintaining recorded media content 214, a playback application 216, and a rating application 218 which can be implemented as computer executable instructions and executed by the processor(s) 210 to implement embodiments of automatic rating optimization. The client device 116 can also include media content 220 which can be any form of on-demand and/or broadcast media content. Additionally, the television-based client device 116 can be implemented with any one or combination of the components described with reference to a client device 600 shown in FIG. 6. Further, the client device 116 and display device 202 together are but one example of a television-based system, examples of which are described with reference to the exemplary entertainment and information system 700 shown in FIG. 7.

The recording media 212 along with the playback application 216 can be implemented as a digital video recording (DVR) system to record and maintain the recorded media content 214. The recorded media content 214 may be any form of broadcast and/or on-demand media content 220 that the client device 116 receives and records. Further, in some implementations, the client device 116 may access or receive additional recorded media content from one or more remote data stores (not shown). According to exemplary embodiments, the playback application 216 is a video control application which can be implemented to control the playback of the media content 220 and/or to control the playback of the recorded media content 216 for viewing on the display device 202.

In some instances, DVR systems or video on demand (VOD) services that implement the description herein may provide rating information on less than an entire instance of given media content. For example, such systems and/or servers may rate one or more constituent portions or subsets of the media content by monitoring how many times those portions are replayed by viewers and/or reviewers. The more often that a given portion is "rewound" and repeated, the more highly that portion may be rated. In addition, where the content is structured into chapters, or other suitable organizational construct, the content appearing in the chapters may be rated based on reviews of the chapters.

In the illustrated example, the television-based client device 116 is configured for communication with the content provider(s) 204 via a communication network 222, which in this example is an Internet protocol-based (IP-based) network. The client device 116 can receive programs, media content, and/or program guide data, from the content provider(s) 204 via the IP-based network 222.

The content provider 204 includes a data store 224 which stores various media content assets and/or programs 226 which can be communicated to the client device 116, and also includes the program rating system 102. The program rating system 102 includes the rating collection/distribution service 108, the rating adjustment service 110, the rating database 112, and can also include the associated Website or Website hosting application 114.

Although the rating adjusting service 110 and the rating collection/distribution service 108 are each illustrated and described as single application programs, the rating adjusting service 110 and the rating collection/distribution service 108 can be implemented as several component applications distributed to each perform one or more functions in the program rating system 102. Further, although the rating adjusting service 110 and the rating collection/distribution service 108 are illustrated and described as separate application programs, the rating adjusting service 110 and the rating collection/distribution service 108 can be implemented together as a single application program in the content provider 204 to implement embodiments of automatic rating optimization.

Similarly, although the rating database 112 and the website 114 are each illustrated and described as being located at the content provider 204, the rating database 112 and the website 114 can be implemented as several component applications and/or data stores distributed to each perform one or more functions in the program rating system 102. In one implementation, a Web browser can be implemented in the television-based device 116 and used to access the Website 114 via a communication network 228, which may be for example the Internet. The Web browser can also be implemented in the television-based device 116 and used to access the Website 114 via the communication network 222.

In the illustrated example, the computing device 118 is also configured for communication with the Website 114 which is hosted by the content provider 204 via the communication network 228 (e.g., the Internet). Therefore, the viewer-rating source 104 may use the television-based client device 116 and/or may use the computing device 118 to access the Website 114 to communication program ratings, comments regarding programs, and/or other information to the content provider 204 via the Website 114. The program ratings, comments regarding programs, and/or other information which have been communicated to the content provider 204, are then communicated to the rating collection/distribution service 108, and to the rating adjusting service 110 to implement various aspects of automatic rating optimization. The program ratings, comments regarding programs, and/or other information which have been communicated to the content provider 204 can be stored in the rating database 112.

With this background, and with general reference to FIGS. 1 and 2, one can appreciate various implementations of automatic rating optimization. For example, the viewer/rating source 104 may provide a rating for a program and/or comments regarding the program to the program rating system 102. The viewer 104 may submit the program rating and/or comments regarding the program to the program rating system 102 using the television-based client device 116 and/or using the computing device 118.

In one implementation the television-based client device 116 generates a graphical user interface (not shown) which is displayed for the viewer 104 on the display device 202. The viewer/rating source 104 uses one or more of the user interface devices 206 and 208 to navigate the graphical user interface and to enter a rating and/or to provide comments regarding and/or critiquing the program. Such ratings and/or comments for a program can be received from one or more rating sources, such as the viewer/rating source 104, and these ratings can be stored in the rating database 112.

In another implementation, the viewer/rating source 104 can use a Web browser implanted in the computing-based device 118 and/or implemented in the television-based client device 116 to access the Website 114 via the communication network 228. Once the viewer 104 has accessed the Website 114, the viewer can navigate the Website 114 and enter a rating for the program and/or provide comments regarding the program using one or more of the user interface devices 206 and 208. Such ratings and/or comments for a program can be received from one or more rating sources, such as the viewer/rating source 104, and these ratings can be stored in the rating database 112.

According to exemplary embodiments, the ratings for a program and/or comments regarding the program are then communicated to the potential viewers 104 of the program. The rating adjusting service 110 of the program rating system 102 counts access events for the program over a duration of time and determines how the ratings provided by each of the rating sources 104 affect popularity of the program. Standard data mining techniques can be used to determine whether a rating given or assigned by a particular rating source, such as the rating source 104, changes the behavior of the potential viewers 104. For example, one or more computers can be configured to determine how access events correlated to ratings received from the particular rating source 104. As used herein, the term "access events" refers to the viewer 104 selecting a program or other media content asset. For example, this can simply be selecting the program via an electronic programming guide and/or can be selecting and/or purchasing a program (e.g., a video on demand (VOD) program), and/or any other similar events. Such access events can be easily tracked, counted, and measured.

By way of example, if the rating source 104/106 rates a particular program very highly (e.g., with five stars and/or with a laudatory description), access events following communication of the rating to the potential viewers 104 can be easily tracked and counted, such that one can determine how the rating affects access events for and/or sales of the program during a period of time (e.g., over the next four weeks). Over time, additional rating sources 104/106 will also rate the program, and these additional ratings can also be communicated to the potential viewers 104. Once again, access events (or sales) following communication of the additional rating can be tracked and counted, such that one can determine how the ratings received from each of the additional rating sources 104/106 affect sales of the program during a subsequent period of time (e.g., over the four week period). Ratings from some of the additional rating sources 104/106 may have a positive effect on sales of the program, while additional rating from other sources 104/106 may have a negative affect or no effect on sales of the program. The measured affect provides an approximation of whether the rating source 104/106 provided ratings that were pertinent to the potential viewers. In other words, ratings received from a particular rating source, such as the rating source 104/106, may have a high correlation with a potential viewer's preferences, a low correlation with a potential viewer's preferences, or even an inverse correlation with a potential viewer's preferences.

An overall rating (e.g., stars rating, points, letter grade, etc.) is then determined for the program. More specifically, the overall rating for a given program may be multi-dimensional, in the sense that the overall rating may be based on a series of ratings that consider different criteria. For example, a given movie might receive a first rating as an action movie, a second rating as a science fiction move, a third rating as drama, a fourth rating that reflects its appeal to horse enthusiasts, and so on. Once all these dimensions are compared between the program and a viewer, an aggregate rating can be assigned across all the dimensions.

When determining the overall rating for the program, the weight accorded to ratings received from the different rating sources can be adjusted so that rating sources which are more accurate (e.g., those which have a positive correlation to potential viewers preferences and/or increase sales) are given more weight, and so that rating sources which are less accurate (e.g., those which have a negative correlation to potential viewers preferences and/or decrease sales) are given less weight.

The overall rating for the program is then sent to the potential viewers 104 who may or may not be interested in viewing the program. The rating adjusting service 100 once again determines how the ratings and/or comments provided by the rating sources 104/106 affects popularity of the program and the overall rating can be continuously and/or periodically modified based as the weight accorded to the different rating sources 104/106 is adjusted.

In one implementation the rating sources 104/106 (i.e., those individuals, groups, or entities who provide ratings) are provided with indications of the weights which have been accorded to their various ratings. These indications can be provided via the rating sources 104/106 via any suitable means, for example, the indications can be provided using emails, using pop-ups and/or using Website summaries.

Similarly, the potential viewers 104 who are presented with the ratings and/or comments from the ratings sources 104/106 can be provided with ratings optimized indications, or otherwise be informed that the ratings have been "optimized". These indications can be provided to the potential viewers 104 via any suitable means, for example, the indications can be provided using emails, using pop-ups, and/or Website summaries. In addition, links to more detailed information and statistics regarding the "optimized" ratings can be provided to the potential viewers 104. By way of example, this more detailed information can include details regarding the number of rating sources 104/106 that were included in generating the overall program rating, and/or details regarding the degree to which original ratings were modified by changing weights (from default and/or neutral weights), and/or may provide additional data regarding the rating sources 104/106, and/or any other information which may help potential viewers 104 analyze or better understand the optimized ratings.

In some implementations of automatic rating optimization, the content provider 204 can monitor the rating sources 104/106 to determine various characteristics about the ratings sources' 104/106 viewing and/or non-viewing of a program which was rated, and can then adjust the weight accorded to each of the rating sources 104/106 accordingly. For example, the content provider 204 can ascertain whether the rating source 104/106 accessed the program which it rated, and then adjust the weight accorded to ratings received from the rating source 104/106 based on the ascertaining. The rating adjusting service 100 may accord less weight to a rating received from a rating source, such as the rating source 106, which has not accessed the program which was rated, and more weight to a rating received from a rating source, such as the rating source 104, which has accessed the program.

As another example, the content provider 204 can monitor how much of a program which was rated by the rating source 104 was displayed at the rating source 104, and can adjust the weight accorded to ratings received from the rating source based on the monitoring. The rating adjusting service 110 may accord less weight to a rating received from the rating source 104 which displayed only a short segment of the program which was rated, and may accord more weight to a rating received from the rating sources 104 which displayed the complete program which was rated.

As yet another example, the content provider 204 can monitor whether the program rated by the rating source 104 was accessed on multiple occasions by the rating source 104, and can adjust the weight accorded to ratings received from the rating source 104 based on the monitoring. The rating adjusting service 110 may accord less weight to a rating received from the rating source 104 which displayed the program on only one occasion, and may accord more weight to a rating received from the rating source 104 which displayed the complete program on multiple occasions.

Figure 3:
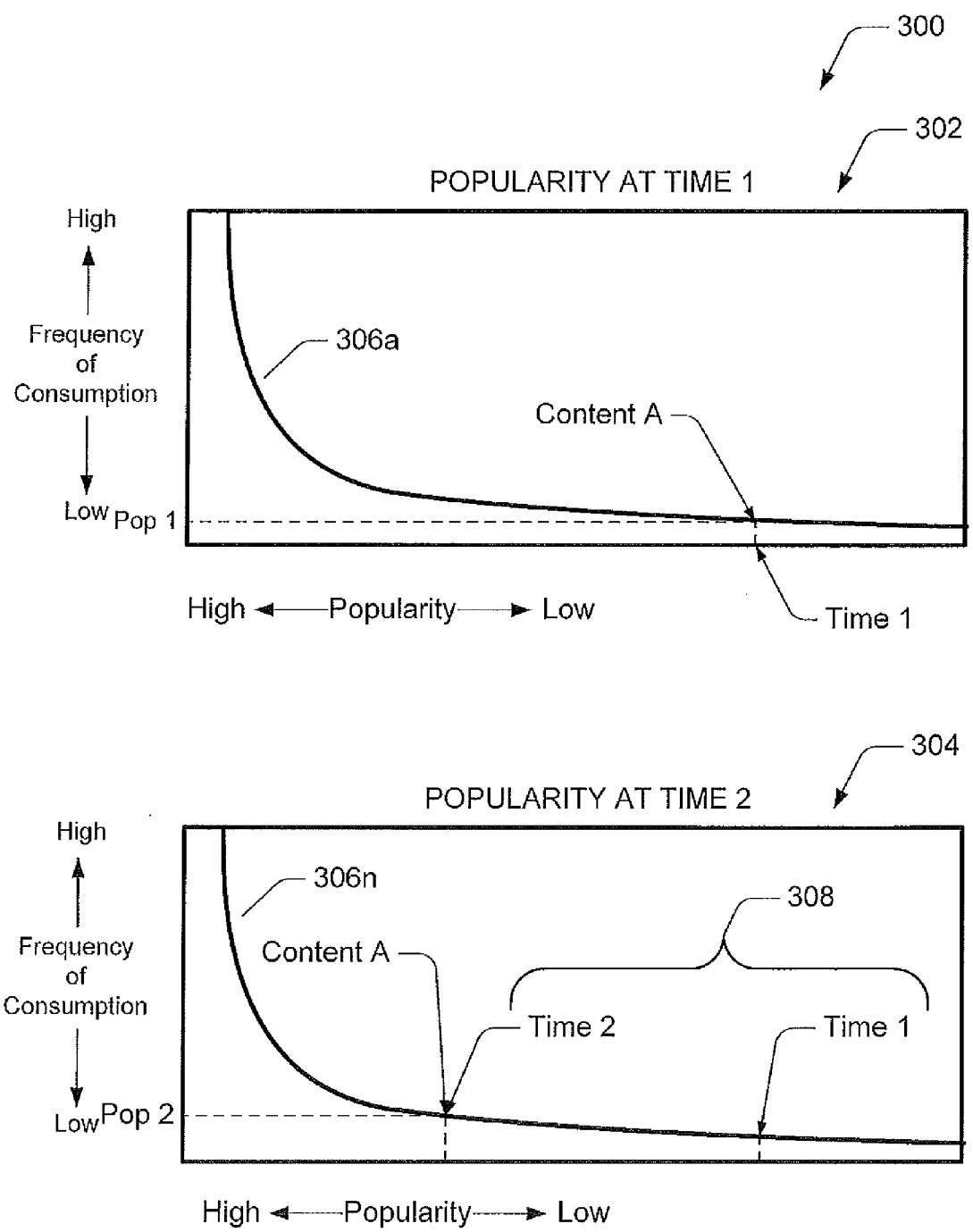
FIG. 3 is a diagram illustrating exemplary graphs in which further aspects of embodiments of automatic rating optimization are described.

FIG. 3 illustrates exemplary graphs 300 that describe further aspects of embodiments of automatic rating optimization. Graphs 302 and 304 illustrate how popularity of a given instance of content (e.g., "Content A") relates to a position of the program on a long-tail curve or graph. As used herein, the term "long-tail" refers to a feature of statistical distributions where a high frequency or high-amplitude population is followed by a low-frequency or low-amplitude population which gradually diminishes or "tails off". In the context of programs and/or media content items, such a distribution will typically show a long tail of rare or niche content that does not enjoy a large amount of popularity, yet still nevertheless attracts the niche viewers 104. Accordingly, the term "long-tail content" is used here to refer to rare or niche content that does not initially enjoy a large amount of popularity. Advances in technology have allowed the content providers 204 to make increasing amounts of niche content or "long-tail content" available to the potential viewers 104. Automatic rating optimization benefits the viewers 104 by making niche content more easily accessible, and also benefits the content providers 204 by allowing the content providers 204 to increase profits through the provision of the niche content and/or through increased advertising revenues associated with provision of such content.

Turning to the graphs 302 and 304 in more detail, the vertical axes of these graphs represent how frequently various instances of content have been consumed, varying from low to high. The horizontal axes of these graphs represent the popularity of content items, arranged from high to low. Curves 306A and 306N (collectively, curves 306) indicate how many instances of content have achieved given levels of popularity.

Various implementations of automatic rating optimization provide additional ways for determining how the ratings provided by each of the rating sources 106/104 affect popularity of a program. More specifically, the techniques for providing automatic rating optimization may determine a correlation between an instance in which a reviewer rates a given program, and any changes in the popularity of that program that result from that rating. In this manner, these techniques may identify "hit spotters", or, put differently, those reviewers whose ratings are given credibility by increased levels of measured popularity. Additionally the "hit spotter's" rating may serve as a guide for representing the likely perceptions of a number of other reviewers.

For example, the determination can include evaluating a rate of change in popularity of the program over one or more time periods (one or more durations of time). More specifically, the graph 302 may provide a first snapshot of popularity levels taken at an arbitrary first time, denoted "Time 1". The graph 304 may provide a second snapshot of the popularity levels taken at an arbitrary second time, denoted "Time 2", that is shown along with the snapshot taken at Time 1. As another example, the determination can include evaluating a rate of change in popularity of the program over the duration of time and also evaluating an acceleration/deceleration of the change in popularity of the program over the duration of time.

The speed or rate of popularity change (i.e., "S") for a program can be calculated as follows:

$$S = (\text{Pop 2} - \text{Pop 1}) \div (\text{Time 2} - \text{Time 1})$$

where "S" is the speed of popularity change at the end of a particular time period, where "Pop 2" is the position of popularity of the program at "Time 2" (i.e., the end of the time period), and where "Pop 1" is the position or popularity of the program at "Time 1" (i.e., the beginning of the time period). Such a time period or duration of time is indicated by reference number 308.

The acceleration of popularity change (i.e., "A") for a program can be calculated as follows:

$$A = (S2 - S1) \div (\text{Time 2} - \text{Time 1})$$

where "A" is the acceleration of popularity change at the end of a particular time period, where "S2" is the speed of popularity change at "Time 2" (the end of the time period), and where "S1" is the speed of popularity change at "Time 1" (the beginning of the time period). Of course, one may calculate the derivative of the velocity which is the acceleration.

Implementations of automatic rating optimization use the speed of popularity change (i.e., "S") and/or the acceleration of popularity change (i.e., "A") for a program (e.g., Program A) to more accurately analyze and determine the affect that a rating from a particular rating source has had on the popularity of a program. This can be accomplished by periodically measuring program popularity, by periodically calculating the speed of popularity change and/or acceleration of the popularity change for the program, and by periodically adjusting weight accorded to ratings received from the rating source 104/106 according to the results of these measurements and calculations. In this way, the overall ratings of program which are provided to the potential viewers 104 can be continually optimized, so that the overall ratings will emphasize the rating sources 104/106 which have been most relevant and impact-full over time.

Implementation of automatic rating optimization can also be configured to operate in different modes based on: (a) time windows (one or more durations of time); and/or (b) rating volume threshold; and/or, (c) speed and/or acceleration of a program on the long-tail curve; and/or (d) extent of movement of a program on the long-tail curve. Further, when a program initially becomes available, a grace period can be allowed for sufficient rating and/or comments to be collected and for sufficient changes in popularity of the program to occur. Increasingly rigorous weightings can be implemented once the program has been available for a sufficient duration of time, and/or when rating volume increases above a threshold, and/or when the content item's popularity changes dramatically, and/or after other indicators show that more rigorous weighting would be helpful. In other words, adjustment of the ratings for the various sources 104/106 can be initiated when such adjustments are warranted based on any suitable criteria.

Embodiments of automatic rating optimization also prove that the viewer 104 can be associated with a preference profile based on viewing habits of the viewer 104, and that the rating sources 106/104 can be associated with preference profiles based on viewing habits of the rating sources 106/104, so that each rating source 106/104 is associated with one of the preference profiles. A degree of relatedness between the preferences profile of the viewer 104 and the preference profiles of each of the rating sources 106/104 can be determined, and a weight accorded to ratings received from each of the rating sources 106/104 can be adjusted based on the determining degree of relatedness.

Automatic rating optimization provides that preference profiles can be established for the viewers 104 and/or the rating sources 106/104, and that such preference profiles can be used to generate more accurate rating of programs. In addition, the viewing habits of the viewer 104 can be monitored, so that a weight accorded to program ratings and/or recommendations sent to the viewer 104 can be adjusted according to the viewer's preferences.

In one implementation the viewer 104 is presented with a customized rating base on their personal profile. The program rating presented to one potential viewer 104 can be different than the rating presented to another potential viewer 104 for the same program, because the potential viewers' individual preference profiles can be taken into consideration and the rating can be adjusted accordingly. For example, a lower weight can be accorded to ratings received from the rating sources 106/104 that are in profiles distant from the viewer's personal profile, while more weight can be accorded to the ratings received from the rating sources 106/104 that are in profiles proximate the viewer's profile.

In another implementation the viewers 104 are associated with a group of viewers 104 based on shared viewing preferences, and each viewer 104 in the group is presented with program ratings which have been tailored and/or adjusted based on a group profile. In such implementation, a program rating presented to one group of potential viewers 104 can be different than the rating presented to another group of potential viewers 104 for the same program, because the potential viewers' group profiles can be taken into consideration, and the rating can be adjusting accordingly.

The profiles can be used by the program rating system 102 to identify the niche viewers 104 that may have similar viewing interests and/or programming preferences. The program rating system 102 can use the profiles of the viewers 104, and/or the rating sources 106/104 in a flexible way to match interests and provide the viewers 104 with rating and/or recommendations which will be more trustworthy and applicable to the viewer's interests. For example, a group of viewers 104 who are interested in a particular form of dance may receive ratings which are based on reviews and/or ratings by others who share this common interest, and thus able to provide reviews which are applicable to the unique interests of the group of viewers 104.

Preferences of one or more of the rating sources 104/106 can be used to generate a moderator channel. Alternatively, the preferences used to set-up the moderator channel can be provided by the content provider 204 and/or can be provided by some other source. The moderator channel provides program ratings and/or recommendations which are weighted based on a particular set of preferences which define the moderator channel. For example, the potential viewer 104 may select to have ratings and/or recommendations weighted according to a particular moderator channel in which ratings are adjusted for the viewers 104 who like science fiction but dislike mysteries. Any number of differently weighted moderator channels can be established to aid the viewers 104 with different viewing preferences, by providing useful ratings which will help them locate programs they will enjoy watching.

In light of the description herein, one can appreciate that automatic rating optimization provides systems and methods which assist the viewers 104 in finding content which they will want to view by providing content ratings the viewers 104 can trust. By using feedback from content access counting as described herein, the weight accorded to program ratings received from various rating sources 104/106 can be differently adjusted. The weight accorded to the ratings received from the various rating sources 104/106 can be adjusted based on the degree to which past ratings from those particular rating sources 104/106 have translated into content position and change in position on the long-tail curve (measured via content access counting).

Implementations of automatic rating optimization provide that each content item/program can be separately measured and/or that each rating source 104/106 can be separately weighted. An aggregation of ratings for a particular content item/program from weighted rating sources can be calculated, and the aggregation provides an overall rating for that content item/program. The overall rating can be continuously optimized based on additional feedback from the content access counting. Additionally, if desired, profiles can be developed for the rating sources 104/106 and/or for the viewers 104, and can be used to provide customized accuracy. Implementations of automatic rating optimization tie ratings to results (e.g., content access counts) for individual content items/programs, to groups of the rating sources 104/106, and to groups of the viewers 104. This allows viewers 104 to know that the ratings can be trusted, are useful, and that the ratings can be reliably used to select content/programs.

Methods for automatic rating optimization, such as exemplary methods 400 and 500 described with reference to respective FIGS. 4 and 5, may be described in the general context of computer executable instructions, Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 4:
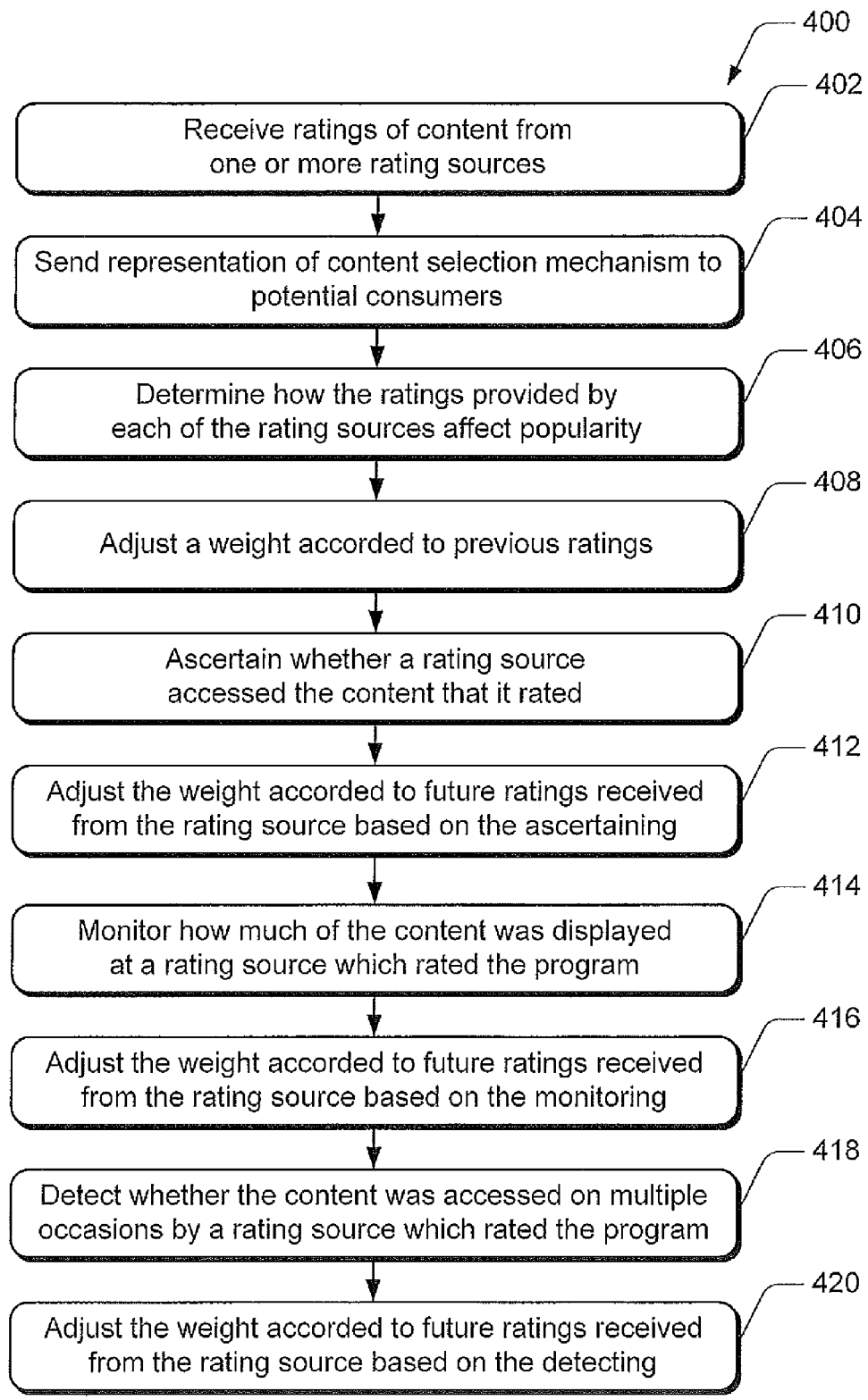
FIG. 4 is a flow diagram illustrating exemplary method(s) for automatic rating optimization.

FIG. 4 illustrates the exemplary method 400 for automatic rating optimization and is described with reference to the exemplary environment 100 shown in FIG. 1, and with reference to the exemplary environment 200 shown in FIG. 2. The order in which the method is described is not intended to be construed as a limitation, and any number of the described method block can be combined in any order to implement the method, or an alternate method. Furthermore, the method can be implemented in any suitable hardware, software, firmware, or combination thereof.

Block 402 represents receiving ratings of a program from one or more rating sources. For example, the program rating system 102 can receive one or more ratings for a program from the viewers/rating sources 104 and/or from the rating sources 106. The ratings can be entered by the viewer/rating sources 104 via the television-based device 116 and/or via the computing device 118, and/or can be entered by the rating sources 106 via the television-based client device 120 and/or via the computing device 122.

Block 404 represents sending a representation of a program selection mechanism to potential viewers of the program. More specifically, block 404 may include using the rating information in various algorithms in order to help the potential viewers 104 select a desirable program. In other words, the ratings may enable the program selection mechanism to compile a channel listing or play list, a menu of suggested programs, or the like.

In some instances, presenting the representation to the viewers 104 may include directly presenting one or more ratings for a given instance of content, such that the potential viewer 104 may directly examine, browse, compare, and/or further access the one or more ratings determined for each content item.

Additionally, the representation presented to consumers may take different forms, in different possible implementations. For example, in some implementations, the representation may include a visual representation, whether in image, video, or other form. In other implementations, the representation may include audible or audio aspects, for example, when the consumer is visually impaired. In still other implementations, the representation may combine visual and audible aspects into a multimedia presentation. The representation of the ratings may also be customized, in the sense that the ratings may be reflected in the order in which the items are presented in a list, the assignment of a channel as presented to a viewer, or the presence in a listing after the techniques described herein have culled out less relevant content.

Block 406 represents determining how the ratings provided by each of the rating sources 104/106 affect popularity of the program by counting access events for the program over a duration of time. For example, one or more computers can be configured to determine how access events correlated to ratings received from the particular rating source 104/106, and standard data mining techniques can be used to determine whether a rating given or assigned by the particular rating source 104/106 changed the behavior of the potential viewers 104.

Block 408 represents adjusting one or more weights accorded to past ratings received from the rating sources on the current ratings. For example, if the rating source's 104/106 prior ratings have had a positive affect on popularity of programs which it rated, a higher weight can be accorded to ratings received from that rating source 104/106. On the other hand, if the rating source's 104/106 prior ratings have had a negative affect on popularity of programs which it rated, a lower weight can be accorded to ratings received from that rating source 104/106. By adjusting the weight accorded to the ratings received from different rating sources 104/106, a more useful overall rating can be assigned to a program.

Block 410 represents ascertaining whether the rating source 104/106 accessed the program which it rated. For example, the content provider 204 can ascertain whether the rating source 104/106 accessed the program which it rated.

Block 412 represents adjusting the weight accorded to ratings received from the rating source 104/106 based on the ascertaining. For example, the rating adjusting service 110 may accord less weight to a rating received from the rating source 104/106 which has not accessed the program which was rated, and more weight to a rating received from the rating source 104/106 which has accessed the program.

Block 414 represents monitoring how much of the program was displayed at the rating source 104 which rated the program. For example, the content provider 204 can monitor how much of a program which was rated by the rating source 104 was displayed at the rating source 104.

Block 416 represents adjusting the weight accorded to ratings received from the rating source 104 based on the monitoring. For example, the rating adjusting service 110 may accord less weight to a rating received from the rating sources 104 which displayed only a short segment of the program which was rated, and may accord more weight to a rating received from the rating sources 104 which displayed the complete program which was rated.

Block 418 represents detecting whether the program was accessed on multiple occasions by the rating source 104 which rated the program. For example, the content provider 204 can monitor whether the program rated by the rating source 104 was accessed on multiple occasions by the rating source 104.

Block 420 represents adjusting the weight accorded to ratings received from the rating source based on the detecting. For example, the rating adjusting service 110 may accord less weight to a rating received from the rating sources 104 which displayed the program on only one occasion, and may accord more weight to a rating received from the rating sources 104 which displayed the complete program on multiple occasions.

Figure 5:
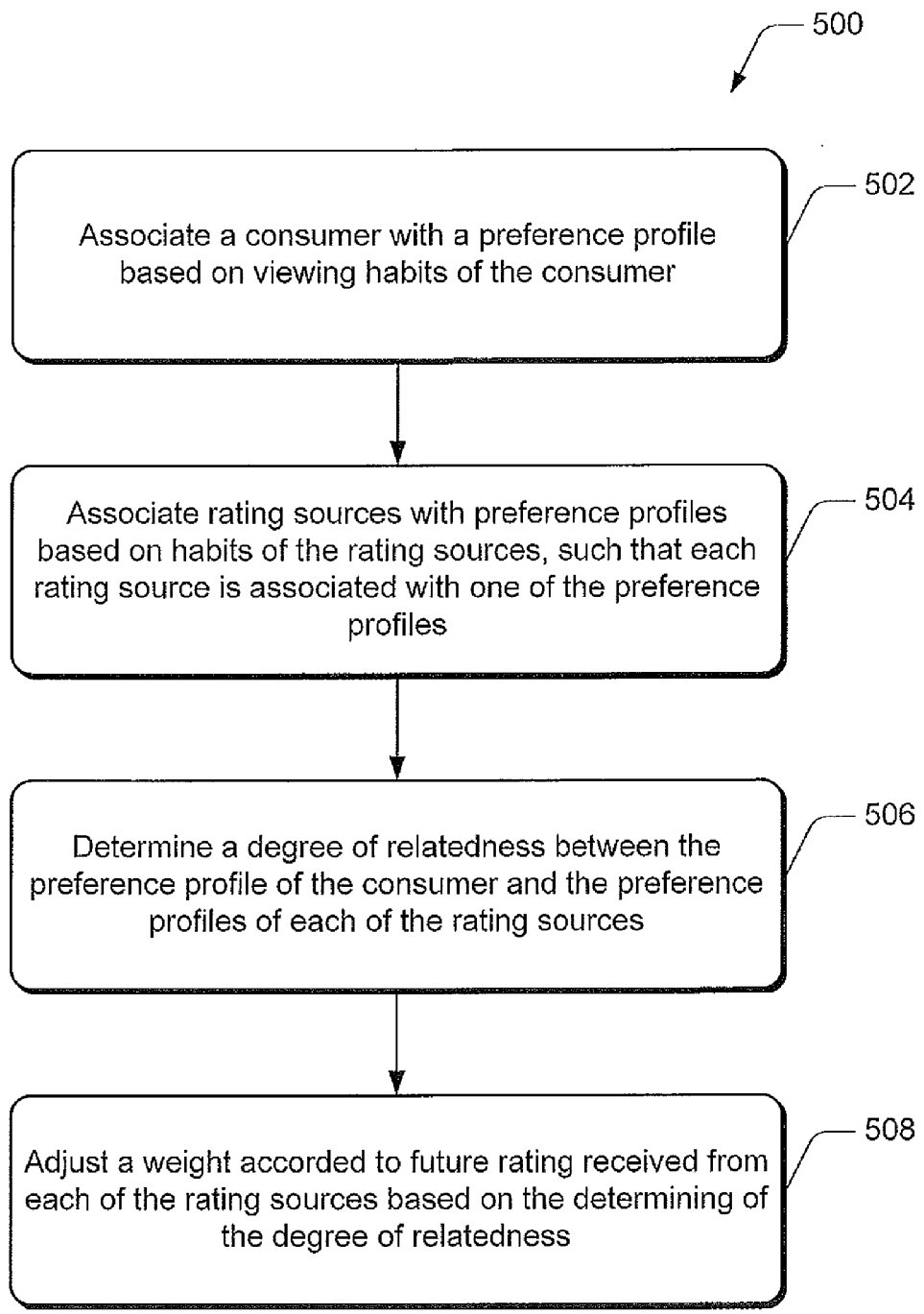
FIG. 5 is a flow diagram illustrating exemplary methods(s) for automatic rating optimization.

FIG. 5 illustrates the exemplary method 500 for automatic rating optimization and is described with reference to the exemplary environment 100 shown in FIG. 1, and with reference to the exemplary environment 200 shown in FIG. 2. The order in which the method is described is not intended to be construed as a limitation, and any number of the described method blocks can be combined in any order to implement the method, or an alternate method. Furthermore, the method can be implemented in any suitable hardware, software, firmware, or combination thereof.

Block 502 represents associating a viewer with a preference profile based on viewing habits of the viewer. For example, the viewer 104 can be associated with a preference profile based on the viewing habits of the viewer 104. This can involve monitoring the viewer's 104 viewing habits.

Block 504 represents associating the rating sources 104/106 with preference profiles based on viewing habits of the rating sources 104/106, such that each rating source 104/106 is associated with one of the preference profiles. For example, other viewer/rating sources 104 can be associated with a preference profile based on the viewing habits of the other viewer/rating sources 104. This can involve monitoring the other viewer/rating sources' 104 viewing habits.

Block 506 represents determining a degree of relatedness between the preference profile of the viewer 104 and the preference profiles of each of the rating sources 104/106. For example, the profile of the one viewer 104 can be compared to the profile of the other viewer/rating source 104 to determine a degree of relatedness between the preference profile of the one viewer 104 and the preference profiles of each of the other viewer/rating sources 104.

Block 508 represents adjusting a weight accorded to rating received from each of the rating sources 104/106 based on the determining of the degree of relatedness. For example, the weight accorded to ratings received from each of the other viewer/rating sources 104/106 can be adjusted based on the determining of the degree of relatedness to the one viewer 104.

Figure 6:
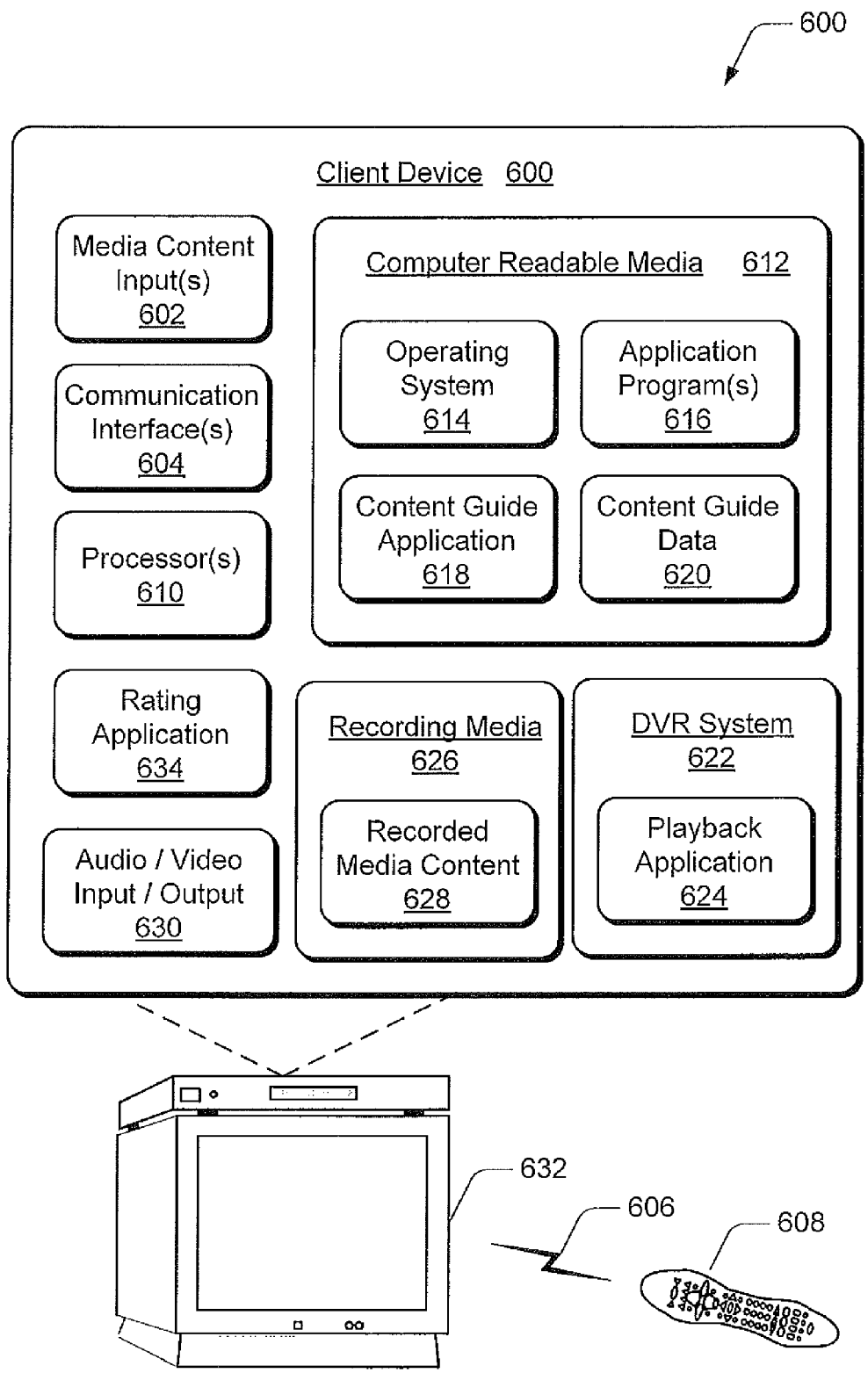
FIG. 6 is a block diagram illustrating various components of an exemplary client device in which embodiments of automatic rating optimization can be implemented.

FIG. 6 illustrates various components of the exemplary client device 600 which can be implemented as any form of a computing, electronic, or television-based client device in which embodiments of automatic rating optimization can be implemented.

The client device 600 includes one or more media content inputs 602 which may include Internet Protocol (IP) inputs over which streams of media content can be received via an IP-based network (such as the network 222 of FIG. 2). The client device 600 also includes one or more communication interface(s) 604 which can be implemented as any one or more of a serial and/or parallel interface, a wireless interface, a modem, a network interface, and as any other type of suitable communication interface. The communication interface 604, such as a wireless interface, enables client device 600 to receive control input commands 606 and/or other information from an input device, such as from remote control device 608, mobile computing device, mobile telephone, and/or similar input device. The communication interface 604, such as a network interface, can be implemented to provide a connection between the client device 600 and a communication network by which other electronic and computing devices can communicate data with the device 600. The communication interface 604, such as a serial and/or parallel interface, can be implemented to provide for data communication directly between the client device 600 and the other electronic or computing devices. The communication interface 604, such as a modem, can be implemented to facilitate communication with other electronic and/or computing devices via a conventional telephone line, a digital subscriber line (DSL) connection, cable, and/or via any other type of suitable connection.

The client device 600 also includes one or more processors 610 (e.g., any of microprocessors, controllers, and/or similar devices) which process various computer executable instructions to control operation of the device 600, and to communicate with other electronic and computing devices, and to implement various embodiments of automatic rating optimization. The client device 600 can be implemented with computer readable media 612, such as one or more memory components. Examples of such memory components include random access memory (RAM), non-volatile memory, tape storage, and/or a disk storage device. A disk storage device can include any type of magnetic or optical storage device, such as a hard disk drive, a compact disc (CD), a digital video disc (DVD), and/or any other similar device.

The computer readable media 612 provides data storage mechanisms to store various information and/or data such as software applications and/or any other types of information and data related to operation of the client device 600. For example, an operating system 614 and/or other application program 616 can be maintained as software applications with the computer readable media 612 and executed on the processor(s) to implement embodiments of automatic rating optimization.

For example, the client device 600 can be implemented to include a program guide application 618 that is implemented to process program guide data 620 and generate program guides for display which enable a viewer to navigate through an onscreen display to locate broadcast programs, recorded programs, video on-demand programs/movies, and/or other media content assets of interest to the viewer.

The client 600 can also include a DVR system 622 with a playback application 624, and recording media 626 to maintain recorded media content 628 which may be any form of on-demand and/or media content such as programs, movies, video, and/or image content that the client device 600 receives and/or records. The playback application 624 is a video control application that can be implemented to control the playback of media content/programs, the recorded media content 628, and/or other video on-demand media content which can be rendered and/or displayed for viewing.

The client device 600 also includes an audio and/or video output 630 that provides audio and/or video to an audio rendering and/or display system 632. Video signals and audio signals can be communicated from the device 600 to the display device 632 via any suitable communication link. Alternatively, the audio rendering and/or display system 632 can be integrated components of the exemplary client device 600.

The client device 600 also includes a rating application 634 that receives ratings form programs and/or comments regarding programs which have been received from one or more rating sources (e.g., 104 and 106). The rating application 634 implements embodiments of automatic rating optimization as described herein.

Figure 7:
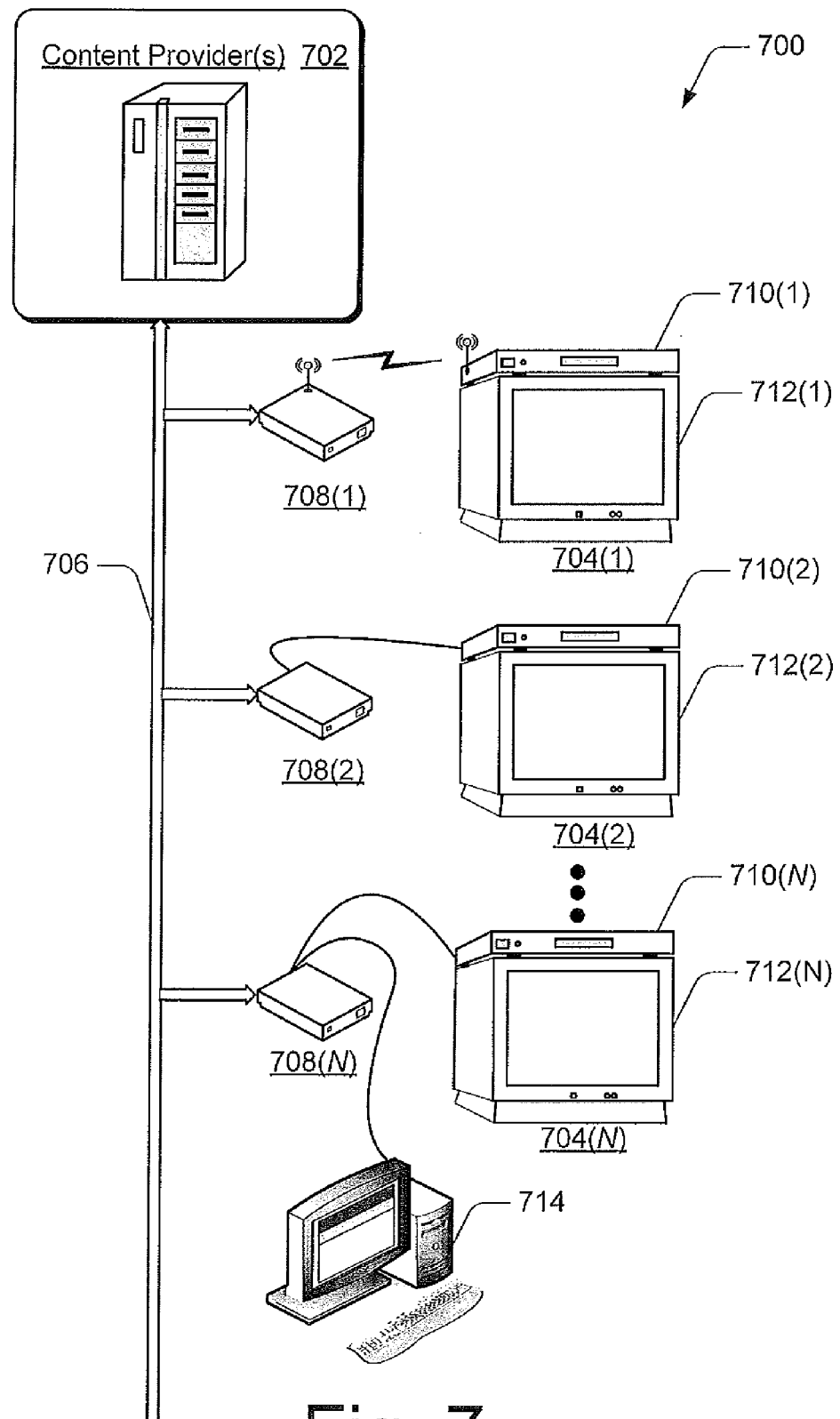
FIG. 7 is a diagram illustrating various devices and components in an exemplary entertainment and information system in which embodiments of automatic rating optimization can be implemented.

FIG. 7 illustrates an exemplary entertainment and information system 700 in which embodiments of automatic rating optimization can be implemented. The system 700 facilitates the distribution of media content/programs and/or program guide data to multiple viewers and/or to multiple viewing systems. The system 700 includes a content provider 702 and television-based client systems 704(1-N) which are each configured for communication via an IP-based network 706. Each of the television-based client systems 704(1-N) can receive one or more data streams from the content provider 702, and the data streams can be distributed to one or more other television-based client devices and/or computing systems.

The network 706 can be implemented as a wide area network (e.g., the Internet), an intranet, a Digital Subscriber Line (DSL) network infrastructure, and/or as a point-to-point coupling infrastructure. Additionally, the network 706 can be implemented using any type of network topology, any network communication protocol, and/or can be implemented as a combination of two or more networks. A digital network can include various hardwired and/or wireless communication links 708(1-N), routers, and so forth to facilitate communication between the content provider 702 and the client systems 704(1-N). The television-based client systems 704(1-N) receive media content, program content, program guide data, and/or similar content items from content server(s) of the content provider 702 via the IP-based network 706.

The content provider 702 is representative of a head-end service in a television-based content distribution system. Such a head-end service provides for example, the media content and/or program guide data and/or similar content to multiple viewers/subscribers (e.g., the television-based client systems 704(1-N)). The content provider 702 can be implemented as a cable operator, a satellite operator, a network television operator, and/or similar operator to control distribution of media content, programs, movies, television programs, and/or other similar media content assets to the client systems 704(1-N).

The content provider 702 can include various components to facilitate media data processing and content distribution, and/or can be linked to other various remote components which facilitate such media data processing and content distribution.

The television-based client systems 704(1-N) can be implemented to include the television-based client services 710(1-N) and a display device 712(1-N) (e.g., a television, LCD, and/or similar device). The television-based client device 710 of the television-based client system 704 can be implemented in any number of embodiments, such as a set-top box, a digital video recorder (DVR) and playback system, an appliance device, a gaming system, and as any other type of client device that may be implemented in a television-based entertainment and information system. In one embodiment, one or more of the client systems 704 can be implemented with a computing-based device. In the illustrated example, the client system 704(1-N) is implemented with a computing-based device 714 as well as the television-based client device 704. Any of the television-based client devices 710 and/or computing-based devices 714 of the television-based client system 704 can implement features and embodiments automatic rating optimization as described herein.

Figure 8:
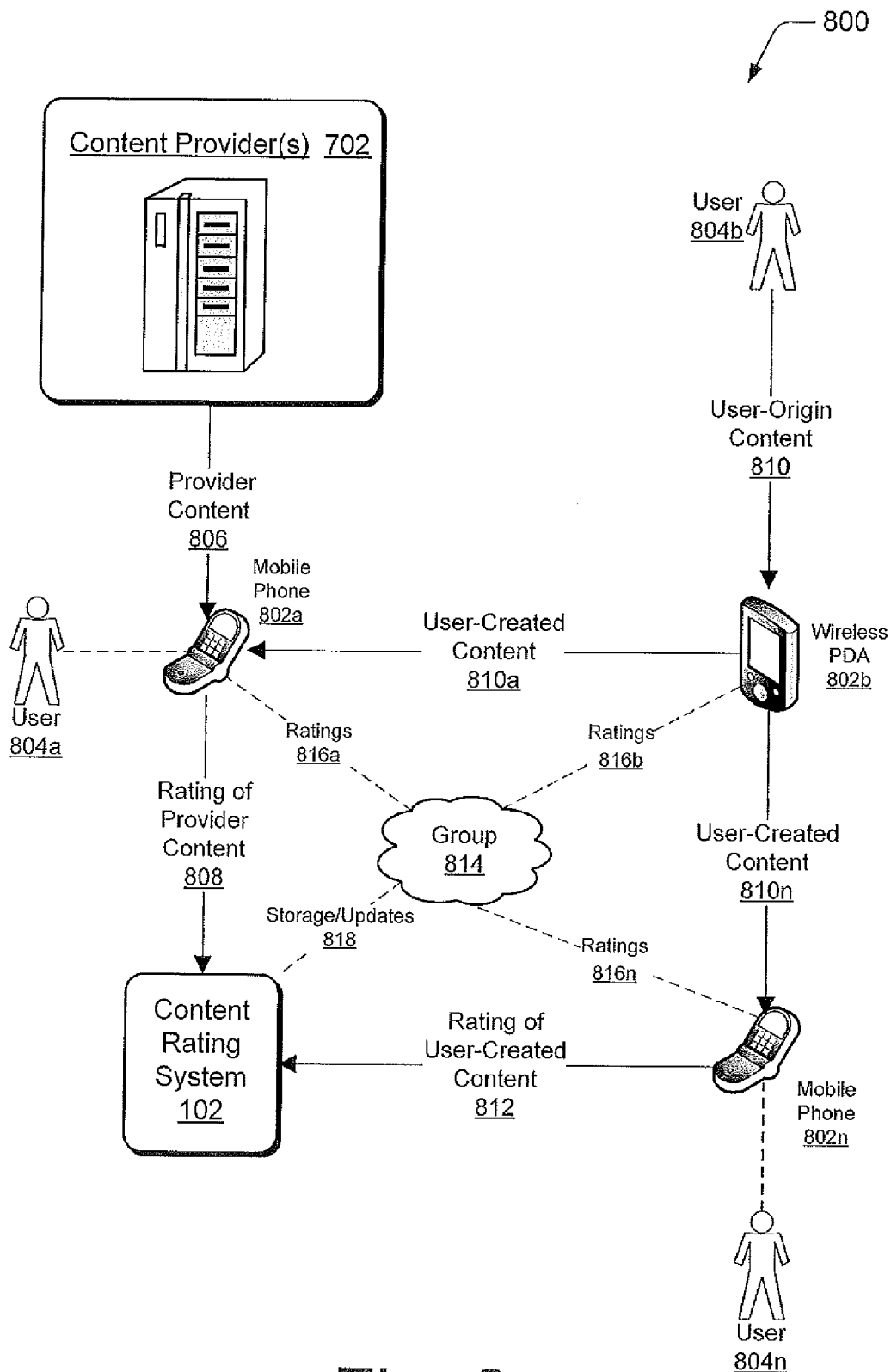
FIG. 8 is a diagram illustrating operating environments that extend the pervious techniques for automatic rating optimization to portable wireless devices.

FIG. 8 illustrates operating environments 800 that extend the previous techniques for automatic rating optimization to portable wireless devices. For convenience, but not limitation, some features are carried forward from the description above into FIG. 8, and denoted by the same reference numbers.

For conciseness of illustration only, FIG. 8 depicts several wireless communications devices 802a-n, associated with respective user 804a-n as indicated by the dashed lines shown connecting these elements in FIG. 8. The wireless communications devices 802a-n may take any convenient form, and are not limited by the example devices shown in FIG. 8. In general, the operating environments 800 may include any number of users 804a-n or devices 802a-n.

In the example illustrated in FIG. 8, the operating environments 800 may enable the user 804a to receive content from one or more content providers, which are carried forward into FIG. 8 as 702. FIG. 8 denotes the provider content at 806. The operating environments 800 may enable the user 804a to receive and access the content 806 via a wireless device, such as the mobile phone 802a. The user 804a may also rate the provider content 806, with the rating denoted generally at 808. The user 804a may transmit this rating to a content rating system 102, which is carried forward into FIG. 8 as 102.

As also shown in FIG. 8, the user 804b may create user-origin content, denoted generally at 810. The operating environments 800 may enable the user 804b to send the content 810 to one or more other users via a wireless device, such as the wireless PDA 802b. More specifically, the user 804b may send the content 810 to the user 804a and the user 804n. FIG. 8 denotes the content 810 as sent to the users 804a and 804n respectively at 810a and 810n. In turn, the users 804a and 804n may access the user-origin content 810 via wireless devices, such as the respective mobile phones 802a and 802n.

Having received and accessed the user-origin content 810, the users 804a and 804n may rate the user-origin content 810, extending the techniques described above. The users 804a and 804n may provide ratings of the user-origin content 810 to the content rating system 201. For clarity of illustration, FIG. 8 depicts one instance of a rating of the user-origin content 810 at 812, as submitted by the user 804n. However, one or more other users, such as the user 804a, could also submit ratings of the user-origin content 810 as well. In this manner, the content rating system 102 may provide a centralized store that contains ratings of not only the provider content 806, but also the user-origin content 810.

Taken collectively, the users 804a-n and/or the devices 802a-n may form a group, denoted generally at 814. In some instances, the group 814 may be static in nature, and may include the users 804a-n who are friends, family, or have other relationships. In other instances, the group 814 may be dynamic or ad hoc in nature. For example, the group 814 may include the users 804a-n who may be in geographical or physical proximity at a given time, or may share some common interest at that given time.

The users 804a-n who form the group 814 may submit ratings of content to the group. FIG. 8 denotes these ratings generally at 816, with examples of ratings originating from the users 804a-n shown respectively at 816a-n. These ratings may include ratings of the provider content 806 or the user-origin content 810. It is noted that any of the user-origin content 810 rated at 816 may or may not include content submitted by users within the group 814. Instead, the user-origin content 810 may originate from a user who is not within the group 814.

While FIG. 8 shows the group 814 for convenience, the operating environments 800 may include any number of groups. Additionally, the users 804a-n may be members of one or more groups.

In the foregoing manner, the users 804a-n within the group 814 may define "hits" or other forms of popular or highly-rated content within the context of the group. Additionally, the users 804a-804n who are members of more than one group may propagate highly-rated content from one group to another, whether that content is the provider content 806 or the user-origin content 810.

The ratings 816a-n related to the groups 814 may be stored in data records maintained by, for example, the content rating system 102, as represented generally by the dashed line 818. However, in some instances, these data records may also be maintained, at least in part, by another entity. In any implementation, the group ratings 816a-n may periodically be uploaded or updated to the content rating system 102, as also represented by the dashed line 818.

In some implementations of the description herein, the ratings components may themselves be data elements that are related to the content. However, the ratings components may or may not be co-resident with the associated content. More specifically, the ratings components may be stored as sets of searchable, orderable descriptors that are searchable or accessible separately from the associated content. Thus, the various operating environments described herein may enable users to search for ratings components meeting one or more selection criteria, and browse or parse the ratings components meeting those criteria. Afterwards, the users may then request to obtain the content corresponding to acceptable criteria. The users may submit this request as a process that is separate from the ratings selection process.

In some instances, the ratings selection process and the process for obtaining the content may use different connections having different bandwidths or capacities. As may be expected, transmitting or streaming the content may impose heavier demands on the underlying communications connection than would data transfers associated with the ratings compounds.

Although embodiments of automatic rating optimization have been described in language specific to features and/or methods, it is to be understood that the subject of the appended claims is not necessarily limited to the specific features or methods described. Rather, the specific features and methods are disclosed as exemplary implementations of automatic rating optimization.

The invention claimed is:

1. A method, comprising:
   receiving, by a content rating system, ratings that are associated with a content, wherein the ratings are received from rating sources, wherein a first one of the ratings is from a first one of the rating sources;
   ascertaining, by the content rating system, an indication of whether the rating sources accessed the content;
   determining, by the content rating system, an effect each of the ratings has on a popularity of the content for a time period after which the first one of the ratings is provided to at least one potential consumer of the content;
   ascertaining by the content rating system, preference profiles, wherein each of the rating sources is associated with one of the preference profiles, wherein each of the preference profiles is based on consumption habits of the rating sources, wherein a first one of the preference profiles is associated with the first one of the rating sources and a second one of the preference profiles is associated with a potential consumer of the content;
   determining, by the content rating system, a degree of relatedness between the first one of the preference profiles and the second one of the preference profiles;
   detecting a number of times that the content was accessed by the first one of the rating sources; and
   adjusting, by the content rating system, a weight of the first one of the ratings, wherein:
      the weight of the first one of the ratings is increased if the first one of the ratings comprises a positive rating and the popularity of the content increases in the time period;
      the weight of the first one of the ratings is increased if the first one of the ratings comprises a negative rating and the popularity of the content decreases in the time period;
      the weight of the first one of the ratings is increased if the first one of the rating sources accessed the content;
      the weight of the first one of the ratings is decreased if the first one of the ratings comprises a negative rating and the popularity of the content does not decrease in the time period;
      the weight of the first one of the ratings is decreased if the first one of the ratings comprises a positive rating and the popularity of the content does not increase in the time period;
      the weight of the first one of the ratings is decreased if the first one of the rating sources did not access the content;
      the weight of the first one of the ratings is increased if the degree of relatedness comprises a high degree of relatedness;
      the weight of the first one of the ratings is decreased if the degree of relatedness comprises a low degree of relatedness; and
      the weight of the first one of the ratings is increased if the content was accessed on multiple occasions by the first one or the rating sources.

2. The method of claim 1, further comprising:
   generating, by the content rating system, an average rating for the content, the average rating comprising at least two weighted ratings, wherein the first one of the ratings is one of the at least two weighted ratings; and
   providing, by the content rating system, the average rating to a rating distribution system configured to provide the average rating to potential consumers of the content.

3. The method of claim 1, wherein determining, by the content rating system, the popularity of the content comprises
   determining a number of times the content is accessed.

4. The method of claim 3, wherein determining, by the content rating system, the popularity of the content further comprises determining a first rate of change, wherein the first rate of change is a rate of change of the number of times the content is accessed over a period of time.

5. The method of claim 4, wherein determining, by the content rating system, the popularity of the content further comprises a second rate of change, wherein the second rate of change is a rate of change of the first rate of change.

6. The method of claim 1, further comprising ascertaining an indication of a portion of the content that was accessed by the first one of the rating sources.

7. The method of claim 6, wherein the adjusting further comprises:
   increasing the weight of the first one of the ratings if the first one of the rating sources accessed the content in its entirety; and
   decreasing the weight of the first one of the ratings if the first one of the rating sources did not access the content in its entirety.

8. The method of claim 1, wherein the weight is an authority.

9. A content rating system, comprising:
   a processing system including a processor; and
   a memory that stores executable instructions that, when executed by the processing system, facilitate performance of operations, comprising:

receiving ratings that are associated with a content, wherein the ratings are received from rating sources, wherein a first one of the ratings is from a first one of the rating sources;

ascertaining an indication of whether the rating sources accessed the content;

determining an effect each of the ratings has on popularity of the content for a time period after which the first one of the ratings is provided to at least one potential consumer of the content;

ascertaining preference profiles, wherein each of the rating sources is associated with one of the preference profiles, wherein each of the preference profiles is based on consumption habits of the rating sources, wherein a first one of the preference profiles is associated with the first one of the rating sources and a second one of the preference profiles is associated with a potential consumer of the content;

determining a degree of relatedness between the first one of the preference profiles and the second one of the preference profiles;

detecting a number of times that the content was accessed by the first one of the rating sources; and adjusting a weight of the first one of the ratings, wherein:
the weight of the first one of the ratings is increased if the first one of the ratings if the first one of the ratings rating comprises a positive rating and the popularity of the content increases in the time period;
the weight of the first one of the ratings is increased if the first one of the ratings comprises a negative rating and the popularity of the content decreases in the time period;
the weight of the first one of the ratings is increased if the first one of the rating sources accessed the content;
the weight of the first one of the ratings is decreased if the first one of the ratings comprises a negative rating and the popularity of the content does not decrease in the time period;
the weight of the first one of the ratings is decreased if the first one of the ratings comprises a positive rating and the popularity of the content does not increase in the time period;
the weight of the first one of the ratings is decreased if the first one of the rating sources did not access the content;
the weight of the first one of the ratings is increased if the degree of relatedness comprises a high degree of relatedness;
the weight of the first one of the ratings is decreased if the degree of relatedness comprises a low degree of relatedness; and
the weight of the first one of the ratings is increased if the content was accessed on multiple occasions by the first one of the rating sources.

10. The content rating system of claim 9, further configured to generate an average rating for the content, the average rating comprising at least two weighted ratings.

11. The content rating system of claim 10, further configured to send the average rating to a content provider.

12. The content rating system of claim 9, further configured to determine the popularity of the content by:
counting a number of times the content is accessed over a duration of time.

13. The content rating system of claim 12, further configured to determine the popularity of the content by determining a rate of change of the number of times the content is accessed over a period of time.

14. The content rating system of claim 13, further configured to determine the popularity of the content by determining a rate of change of the rate of change of the number of times the content is accessed over a period of time.

15. The content rating system of claim 9, further configured to determine a portion of the content that was accessed by the first one of the rating sources.

16. The content rating system of claim 15, wherein adjusting the weight further comprises:
increasing the weight of the first one of the ratings if the first one of the rating sources accessed the content in its entirety; and
decreasing the weight of the first one of the ratings if the first one of the rating sources did not access the content in its entirety.

17. The content rating system of claim 9, further configured to adjust a weight of the first one of the ratings, wherein adjusting the weight comprises:
increasing the weight accorded to the first one of the ratings if the first one of the rating sources accessed the content; and
decreasing the weight accorded to the first one of the ratings if the first one of the rating sources did not access the content.

18. The content rating system of claim 9, further configured to:
access preference profiles, wherein each of the rating sources is associated with one of the preference profiles, wherein each of the preference profiles is based on consumption habits of the rating sources, wherein a first one of the preference profiles is associated with the first one of the ratings sources and a second one of the preference profiles is associated with a potential consumer of the content;
determine a degree of relatedness between the first one of the preference profiles and the second one of the preference profiles; and
adjust a weight of the first one of the ratings, wherein adjusting the weight comprises:
increasing the weight accorded to the first one of the ratings if the degree of relatedness comprises a high degree of relatedness; and
decreasing the weight accorded to the first one of the ratings if the degree of relatedness comprises a low degree of relatedness.

19. A non-transitory machine-readable storage medium, comprising executable instructions that, when executed by a processing system including a processor, facilitate performance of operations, comprising:
receiving ratings that are associated with a content, wherein the ratings are received from rating sources, wherein a first one of the ratings is from a first one of the rating sources;
ascertaining an indication of whether the rating sources accessed the content;
determining an effect each of the ratings has on a popularity of the content for a time period after which the first one of the ratings is provided to at least one potential consumer of the content;
ascertaining preference profiles, wherein each of the rating sources is associated with one of the preference profiles, wherein each of the preference profiles is based on consumption habits of the rating sources, wherein a first one of the preference profiles is associated with the first one of the rating sources and a second one of the preference profiles is associated with a potential consumer of the content;

determining a degree of relatedness between the first one of the preference profiles and the second one of the preference profiles;

detecting a number of times that the content was accessed by the first one of the rating sources; and adjusting a weight of the first one of the ratings, wherein:
the weight of the first one of the ratings is increased if the first one of the ratings comprises a positive rating and the popularity of the content increases in the time period;

the weight of the first one of the ratings is increased if the first one of the ratings comprises a negative rating and the popularity of the content decreases in the time period;

the weight of the first one of the ratings is increased if the first one of the rating sources accessed the content;

the weight of the first one of the ratings is decreased if the first one of the ratings comprises a negative rating and the popularity of the content does not decrease in the time period;

the weight of the first one of the ratings is decreased if the first one of the ratings comprises a positive rating and the popularity of the content does not increase in the time period;

the weight of the first one of the ratings is decreased if the first one of the rating sources did not access the content;

the weight of the first one of the ratings is increased if the degree of relatedness comprises a high degree of relatedness;

the weight of the first one of the ratings is decreased if the degree of relatedness comprises a low degree of relatedness; and the weight of the first one of the ratings is increased if the content was accessed on multiple occasions by the first one or the rating sources.

20. The non-transitory machine-readable storage medium of claim 19, wherein the operations further comprise:
generating an average rating for the content, the average rating comprising at least two weighted ratings, wherein the first one of the ratings is one of the at least two weighted ratings; and providing the average rating to a rating distribution system configured to provide the average rating to potential consumers of the content.

* * * * *